United States Patent [19]
Hoffman

[11] Patent Number: 5,659,995
[45] Date of Patent: Aug. 26, 1997

[54] BUCKET SIZED FISHERMAN'S TACKLE BOX

[76] Inventor: Eric G. Hoffman, 1404 Crane St., Arlington Heights, Ill. 60004

[21] Appl. No.: 685,658

[22] Filed: Jul. 24, 1996

[51] Int. Cl.$^6$ .................................................. A01K 97/06
[52] U.S. Cl. ........................... 43/54.1; 43/57.1; 220/504; D3/905
[58] Field of Search ......................... 43/54.1, 57.1, 43/56; 206/315.11; 220/504, 4.27, 23.83, 507; D3/288, 294, 295, 905; D9/428, 420, 435, 436

[56] References Cited

U.S. PATENT DOCUMENTS

| | | | |
|---|---|---|---|
| D. 325,281 | 4/1992 | Jordan | D3/302 |
| 1,470,199 | 10/1923 | Small | 220/524 |
| 2,050,944 | 8/1936 | Greggains | 220/504 |
| 2,765,576 | 10/1956 | Kurek | 220/504 |
| 2,870,932 | 1/1959 | Davis | 43/56 |
| 2,919,169 | 12/1959 | Jackson | 312/235.2 |
| 3,061,136 | 10/1962 | Sterngart | 220/504 |
| 3,378,134 | 4/1968 | Wilkinson et al. | 312/97.1 |
| 3,490,169 | 1/1970 | Tweed | 43/57.1 |
| 3,726,039 | 4/1973 | Borrelli | 43/56 |
| 3,751,845 | 8/1973 | Van Leenwen | 43/56 |
| 3,958,359 | 5/1976 | Doughty | 43/55 |
| 4,067,607 | 1/1978 | Battles | 312/235.2 |
| 4,403,483 | 9/1983 | Lisalda | 62/457.1 |
| 4,611,726 | 9/1986 | Skinnell | 43/56 |
| 4,756,412 | 7/1988 | Graves et al. | 43/54.1 |
| 4,759,148 | 7/1988 | Love | 43/54.1 |
| 4,911,295 | 3/1990 | Venegoni | 220/23.83 |
| 5,303,500 | 4/1994 | Luukonen | 43/54.1 |
| 5,319,877 | 6/1994 | Hagan | 43/54.1 |
| 5,337,892 | 8/1994 | Zaffina | 43/54.1 |
| 5,386,922 | 2/1995 | Jordan | 220/23.83 |

*Primary Examiner*—Jeanne Elpel
*Attorney, Agent, or Firm*—Meroni & Meroni

[57] ABSTRACT

A bucket sized fisherman's tackle box completely containable inside a standard bucket on a closed bottom portion of the bucket. The tackle box comprising a cylindrical housing wall with horizontal oppositely facing open top and bottom rims. A vertical partition having a height coextensive with a length of the cylindrical housing wall. The vertical partition having a top edge, a bottom edge, a first edge and a second edge. The first edge connecting with the cylindrical housing wall at a first internal cylindrical wall position. The vertical partition extending vertically across an internal distance of the cylindrical housing wall and the second edge connecting with the cylindrical housing wall at a second internal cylindrical wall position. A pair of semi-circular top and bottom lid members independently pivotally hinged adjacent each other to respective top and bottom edges of the vertical partition. The lid members independently sealingly engaging respective top and bottom rims of the cylindrical housing wall when each member is in a closed position. Latch closure means for maintaining each member of the respective pair of lid members in the desired closed position. At least one horizontal partition having a first end and a second end. The first end connecting with the cylindrical housing wall at a first internal cylindrical wall location. The horizontal partition extending horizontally between the cylindrical housing wall and the vertical partition. The second end connecting with the vertical partition at a first vertical partition location parallel to the first internal cylindrical wall location.

32 Claims, 3 Drawing Sheets

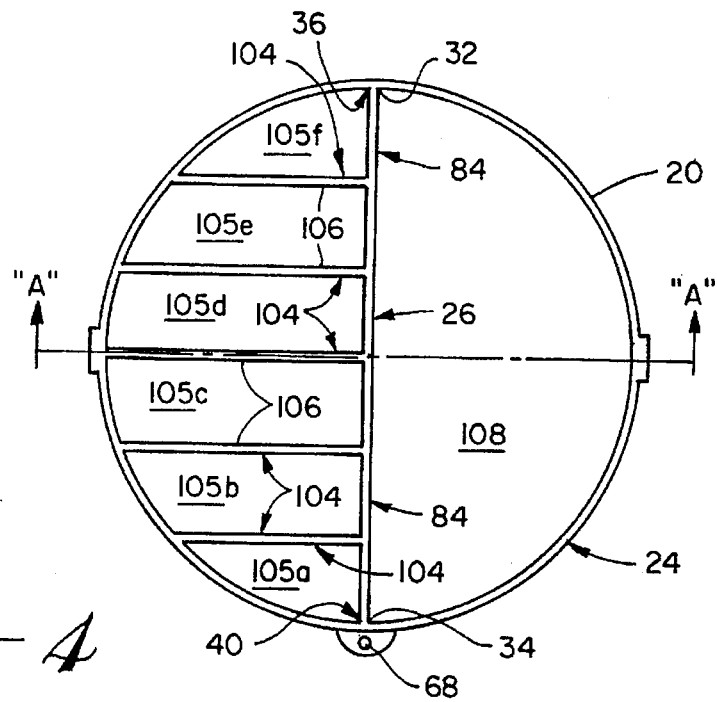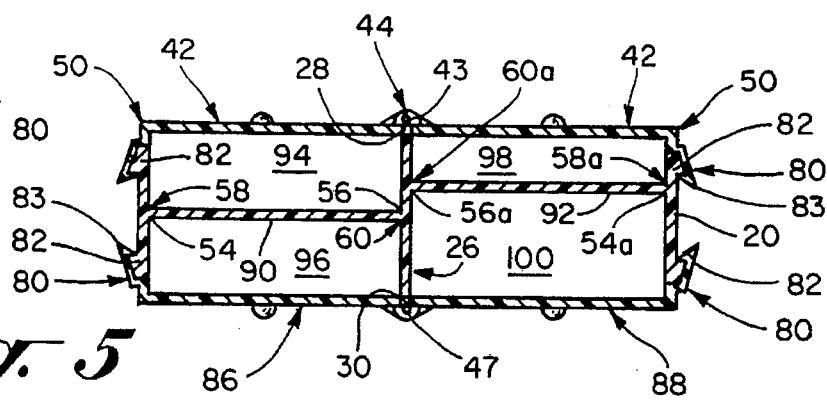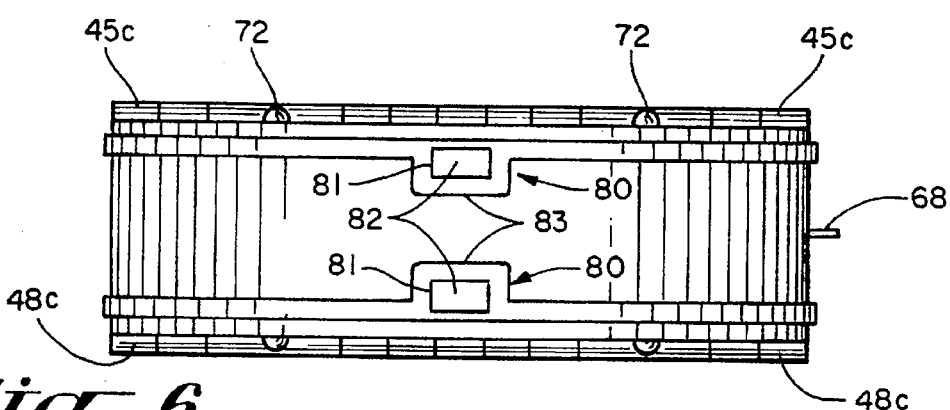

BUCKET SIZED FISHERMAN'S TACKLE BOX

BACKGROUND OF THE INVENTION

1. Field of the Invention

The present invention relates generally to an fisherman's tackle box. More specifically, my invention concerns a bucket sized fisherman's tackle box particularly for ice fishing such that the fisherman's tackle box is adapted for complete containment inside a standard five gallon bucket being seated on the circular planar closed bottom portion of the standard five gallon bucket. In this way, bait, food, poles, gaff and tip-ups to be placed in the bucket at the same time as the fisherman's tackle box enabling simultaneous transportation of the fisherman's tackle box and the bucket and its contents as one unit.

2. Description of the Prior Art

It is well known in the field of recreational fishing that ice fishermen commonly use a standard bucket, and often a five gallon plastic-type bucket, with which to carry their ice fishing gear to their ice fishing hole from their home and vice versa. The typical gear of an ice fisherman generally includes a tackle box, artificial bait and lures, poles, gaff and tip-ups. The typical tackle box comprises a square-type box having an operable top and a closed bottom. A tackle box of this type does not fit neatly inside a five gallon bucket which is cylindrical in shape. Further, having only a single opening top makes accessing the contents of the typical tackle box inconvenient at best and near impossible in other situations.

In an attempt to deal with this problem, prior art patents have utilized a five gallon bucket in conjunction with a tackle box by designing a tackle box that sits on the top rim portion of the five gallon bucket or is suspended from the top rim portion. These invention fail to securely contain the contents of the tackle box during transportation of the bucket and tackle box while at the same time enabling separation of the tackle box from the bucket to independently utilize the tackle box as desired. Further, prior art devices limit access to the internal contents of the bucket to only a top portion. My invention allows the user to gain access to the tackle box contents from either a top or bottom location, as desired, and further allows the user to only have to access one half of the top or bottom contents as desired. To the best of the inventor's knowledge, there does not exist a cylindrical-type tackle box that is designed for complete containment inside a standard bucket resting on the bottom portion of the bucket, thereby enabling simultaneous transportation of the bucket sized fisherman's tackle box, bait, poles, gaff and tip-ups all together inside the standard bucket at one time as a unit. It is true that a square tackle box with a diagonal length no larger than the diameter of a bucket would fit completely inside a standard bucket, resting on the bottom portion of the bucket, if desired. However, such a tackle box would waste much potential storage space inside the tackle box. For this reason, as well as others, in order to utilize a square tackle box having the same storage capacity as my disclosed and claimed bucket sized fisherman's tackle box, one has to use a square tackle box too large to fit inside a standard bucket. Thus, the user must carry the tackle box in a second hand. Having to carry the square tackle box in the other hand is inconvenient and often difficult when one has many things to carry to their ice fishing hole.

The unique features of my invention that differ significantly from any of those in the prior art specifically concern the mathematically configured and proportioned internal compartments and sub-compartments of my bucket sized fisherman's tackle box that maximize the available storage space in a bucket sized fisherman's tackle box. Stated differently, the compartments and sub-compartments have been configured to best accommodate an ice fisherman's artificial bait and tackle gear in a single tackle box unit easily accessible from either the top or the bottom. Further, the mathematically configured and proportioned compartment and sub-compartments are arranged such that if the tackle box were to be folded in half along a line A—A, the compartments or sub-compartments on one side of the line A—A would be a mirror image of the compartments or sub-compartments an opposite side of the line A—A. In this way, the compartment and sub-compartments are arranged to maximize the cylindrical area available to respective upper and lower level compartment and sub-compartments.

These and other types of tackle boxes disclosed in the prior art do not offer the flexibility and inventive features of my Bucket Sized Fisherman's Tackle Box. As will be described in greater detail hereinafter, the Bucket Sized Fisherman's Tackle Box of the present invention differs from those previously proposed.

SUMMARY OF THE INVENTION

According to my present invention I have provided a bucket sized fisherman's tackle box adapted for complete containment inside a standard bucket enabling simultaneous transportation of the bucket sized fisherman's tackle box, bait, food, poles, gaff and tip-ups all together inside the standard bucket. The bucket sized fisherman's tackle box comprises a cylindrical housing wall with a generally horizontal open top rim and an oppositely facing generally horizontal open bottom rim. The tackle box is further defined by a vertical partition having a height coextensive with a length of the cylindrical housing wall. The vertical partition has a top edge, a bottom edge, a first edge and a second edge. The first edge of the vertical partition connects with the cylindrical housing wall at a first internal cylindrical wall position. The vertical partition extends vertically across an internal distance of the cylindrical housing wall and the second edge of the vertical partition connects with the cylindrical housing wall at a second internal cylindrical wall position. A pair of semi-circular top lid members are independently pivotally hinged adjacent each other to the top edge of the vertical partition. The pair of semi-circular top lid members independently sealingly engaging the generally horizontal open top rim of the cylindrical housing wall when each member of the pair of semi-circular top lid members are in a top closed position. A pair of semi-circular bottom lid members are independently pivotally hinged adjacent each other to the bottom edge of the vertical partition. The pair of semi-circular bottom lid members independently sealingly engaging the generally horizontal open bottom rim of the cylindrical housing wall when each member of the pair of semi-circular bottom lid members are in a bottom closed position. Each member of the respective pair of semi-circular top and bottom lid members has latch closure means for maintaining each member of the respective pair of semi-circular top and bottom lid members in respective top and bottom closed positions. The latch closure means is located at an outer edge of each member of the respective pair of semi-circular top and bottom lid members. The tackle box is further defined by at least one horizontal partition. Each of the at least one horizontal partitions has a first end and a second end. The first end of the at least one horizontal partition connects with the cylindrical housing wall at a first internal cylindrical wall location. The at least one horizontal partition extends horizontally between the cylindrical housing wall and the vertical partition, the second end of the at least one horizontal partition connecting with the vertical partition at a first vertical partition location parallel to the first internal cylindrical wall location. The bucket sized fisherman's tackle box is sized for spaced relation between an outermost circumference of the bucket sized fisherman's tackle box and an inner surface of the standard bucket when the bucket sized fisherman's tackle box is completely contained inside the standard bucket.

Another feature of my invention relates to the bucket sized fisherman's tackle box where the vertical partition extends along a diameter of the cylindrical housing wall and thereby dividing the volume internally of the cylindrical housing wall equally in half with a first half of the volume being on a left side of the vertical partition and a second half of the volume being on a right side of the vertical partition. The at least one horizontal partition comprises a left semi-circular horizontal partition and a right semi-circular horizontal partition. Each respective left and right semi-circular horizontal partition extends away from each other. The left semi-circular horizontal partition divides the first half of the volume on the left side of the vertical partition into a left upper compartment completely separate and sealed off from an underlying left lower compartment. The right semi-circular horizontal partition divides the second half of the volume on the right side of the vertical partition into a right upper compartment completely separate and sealed off from an underlying right lower compartment. The underlying left lower compartment comprises six equal width left lower separate parallel sectors in side by side relation along a diameter length of the diameter of the cylindrical housing wall extending perpendicularly away from the diameter of the cylindrical housing wall. Each of the six equal width left lower parallel sectors are separated from another of the six equal width left lower parallel sectors by a series of left lower vertical sector walls extending perpendicularly from the diameter of the cylindrical housing wall to the cylindrical housing wall and thereby defining six left lower sub-compartments in the left lower compartment. A lower edge of the series of left lower vertical sector walls sealingly engages the respective member of the pair of semi-circular bottom lid members when the respective member of the pair of semi-circular bottom lid members is in the bottom closed position.

Still another feature of my invention concerns bucket sized fisherman's tackle box where the vertical partition extends along a diameter of the cylindrical housing wall and thereby dividing the volume internally of the cylindrical housing wall equally in half with a first half of the volume being on a left side of the vertical partition and a second half of the volume being on a right side of the vertical partition. The at least one horizontal partition comprises a left semi-circular horizontal partition and a right semi-circular horizontal partition. Each respective left and right semi-circular horizontal partition extends away from each other. The left semi-circular horizontal partition divides the first half of the volume on the left side of the vertical partition into a left upper compartment completely separate and sealed off from an underlying left lower compartment. The right semi-circular horizontal partition divides the second half of the volume on the right side of the vertical partition into a right upper compartment completely separate and sealed off from an underlying right lower compartment. The underlying right lower compartment comprises a semi-circular open storage space.

According to important features of my invention I have also provided the bucket sized fisherman's tackle box having the vertical partition extending along a diameter of the cylindrical housing wall and thereby dividing the volume internally of the cylindrical housing wall equally in half with a first half of the volume being on a left side of the vertical partition and a second half of the volume being on a right side of the vertical partition. The at least one horizontal partition comprises a left semi-circular horizontal partition and a right semi-circular horizontal partition. Each respective left and right semi-circular horizontal partition extends away from each other. The left semi-circular horizontal partition divides the first half of the volume on the left side of the vertical partition into a left upper compartment completely separate and sealed off from an underlying left lower compartment. The right semi-circular horizontal partition divides the second half of the volume on the right side of the vertical partition into a right upper compartment completely separate and sealed off from an underlying right lower compartment. The left upper compartment comprises six equal width left upper separate parallel sectors in side by side relation along a diameter length of the diameter of the cylindrical housing wall extending perpendicularly away from the diameter of the cylindrical housing wall. Each of the six equal width left upper parallel sectors are separated from another of the six equal width left upper parallel sectors by a series of left upper vertical sector walls extending perpendicularly from the diameter of the cylindrical housing wall to the cylindrical housing wall. A left middle four of the six equal width left upper separate parallel sectors further include a left upper vertical sub-sector wall traversing the left middle four of the six equal width left upper separate parallel sectors and being parallel to the diameter of the cylindrical housing wall and thereby defining ten left upper sub-compartments in the left upper compartment. A first left upper edge of the series of left upper vertical sector walls and a second left upper edge of the left upper vertical sub-sector wall each sealingly engage the respective member of the pair of semi-circular top lid members when the respective member of the pair of semi-circular top lid members is in the top closed position.

Yet another feature of my invention I have provided the bucket sized fisherman's tackle box where the vertical partition extends along a diameter of the cylindrical housing wall and thereby dividing the volume internally of the cylindrical housing wall equally in half with a first half of the volume being on a left side of the vertical partition and a second half of the volume being on a right side of the vertical partition. The at least one horizontal partition comprises a left semi-circular horizontal partition and a right semi-circular horizontal partition. Each respective left and right semi-circular horizontal partition extends away from each other. The left semi-circular horizontal partition divides the first half of the volume on the left side of the vertical partition into a left upper compartment completely separate and sealed off from an underlying left lower compartment. The right semi-circular horizontal partition divides the second half of the volume on the right side of the vertical partition into a right upper compartment completely separate and sealed off from an underlying right lower compartment. The right upper compartment comprises six equal width right upper separate parallel sectors in side by side relation along a diameter length of the diameter of the cylindrical housing wall extending perpendicularly away from the diameter of the cylindrical housing wall. Each of the six equal width right upper parallel sectors being separated from another of the six equal width right upper parallel sectors by a series of right upper vertical sector walls extending perpendicularly from the diameter of the cylindrical housing wall to the cylindrical housing wall. A right middle four of the six equal width right upper separate parallel sectors further include a pair of right upper vertical sub-sector walls traversing the right middle four of the six equal width right upper separate parallel sectors. Each of the pair of right upper vertical sub-sector walls being parallel to the diameter of the cylindrical housing wall and thereby defining fourteen right upper sub-compartments in the right upper compartment. A first right upper edge of the series of right upper vertical sector walls and a pair of second right upper edges of the pair of right upper vertical sub-sector walls each sealingly engage the respective member of the pair of semi-circular top lid members when the respective member of the pair of semi-circular top lid members is in the top closed position.

Still another feature of my invention concerns the bucket sized fisherman's tackle box with latch closure means comprising a resilient lip-latch snap-fitted over a pin. The resilient lip-latch being connected to each member of the respective pair of semi-circular top and bottom lid members and the pin being connected to the cylindrical housing wall adjacent the resilient lip-latch.

According to still further features of my invention I have also provided in combination: a standard five gallon bucket; the standard five gallon bucket defined by a circular open top portion and circular planar closed bottom portion; and a bucket sized fisherman's tackle box adapted for complete containment inside the standard five gallon bucket and for seated engagement on the circular planar closed bottom portion of the standard five gallon bucket. The bucket sized fisherman's tackle box comprises those elements previously mentioned and as discussed in detail hereafter.

Other objects, features and advantages of my invention will become more readily apparent upon reference to the following description when taken in conjunction with the accompanying drawings, which drawings illustrate several embodiments of my invention.

DESCRIPTION OF THE DRAWINGS

FIG. 4 is a bottom internal view of my bucket sized fisherman's tackle box in FIG. 2 with the pair of semi-circular bottom lid members removed;

FIG. 5 is a cut away internal side view of my bucket sized fisherman's tackle box in FIG. 1; and, FIG. 6 is an exploded external side view of my bucket sized fisherman's tackle box in FIG. 1 particularly showing the latch closure means of my invention.

DETAILED DESCRIPTION OF THE PREFERRED EMBODIMENT

Figure 1:
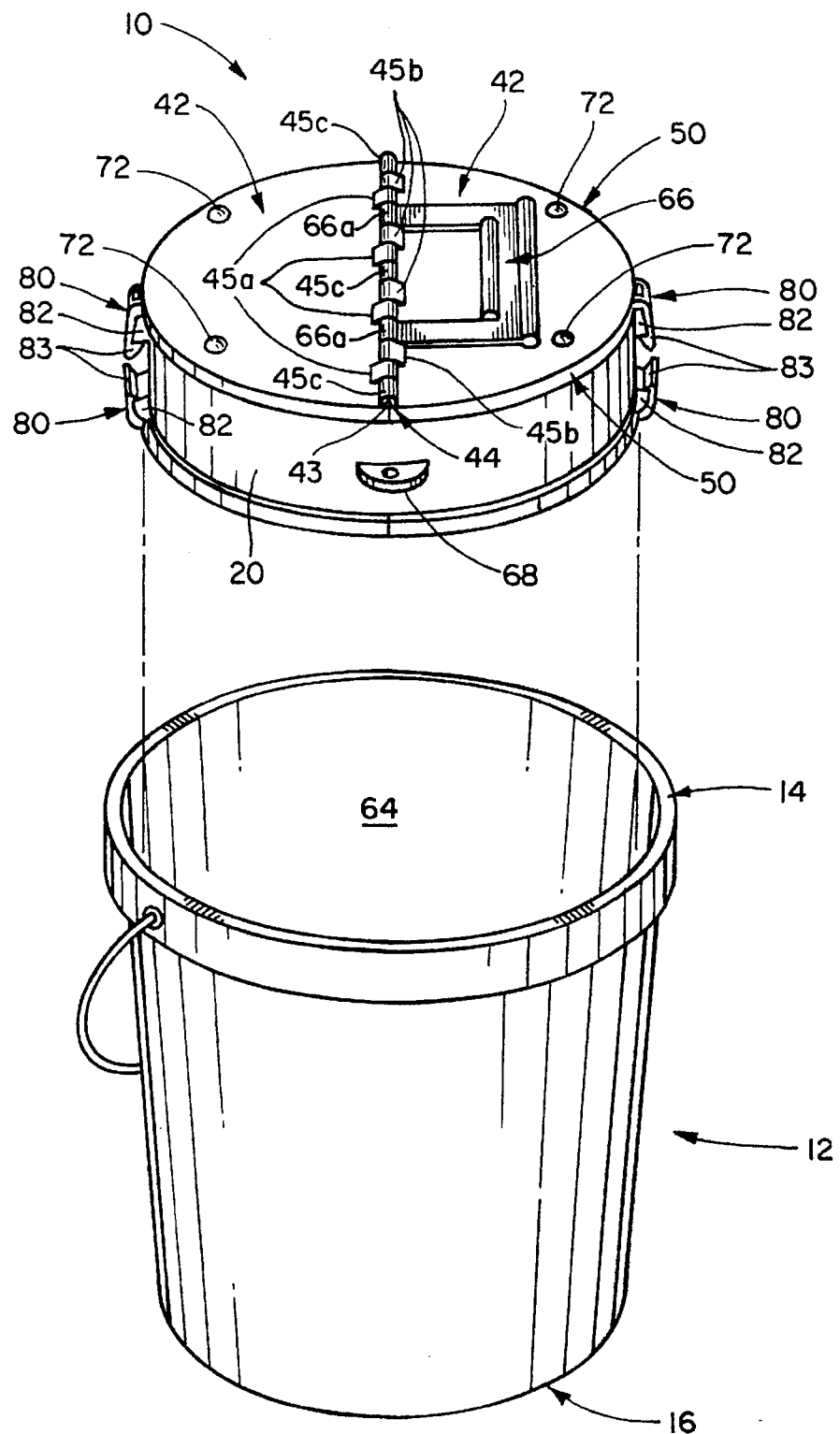
FIG. 1 is a top perspective view of my bucket sized fisherman's tackle box prior to complete containment inside a standard five gallon bucket in accordance with the preferred embodiment of the present invention.

Referring now to the drawings, FIG. 1 shows my new and improved bucket sized fisherman's tackle box 10 adapted for complete containment inside a standard bucket 12. At this time it is contemplated that the standard bucket 12 comprise a standard five gallon bucket commonly used by ice fisherman to carry their bait, food, poles, gaff and tip-ups, not specifically shown in the drawings, all together inside the standard five gallon bucket.

Figure 3:
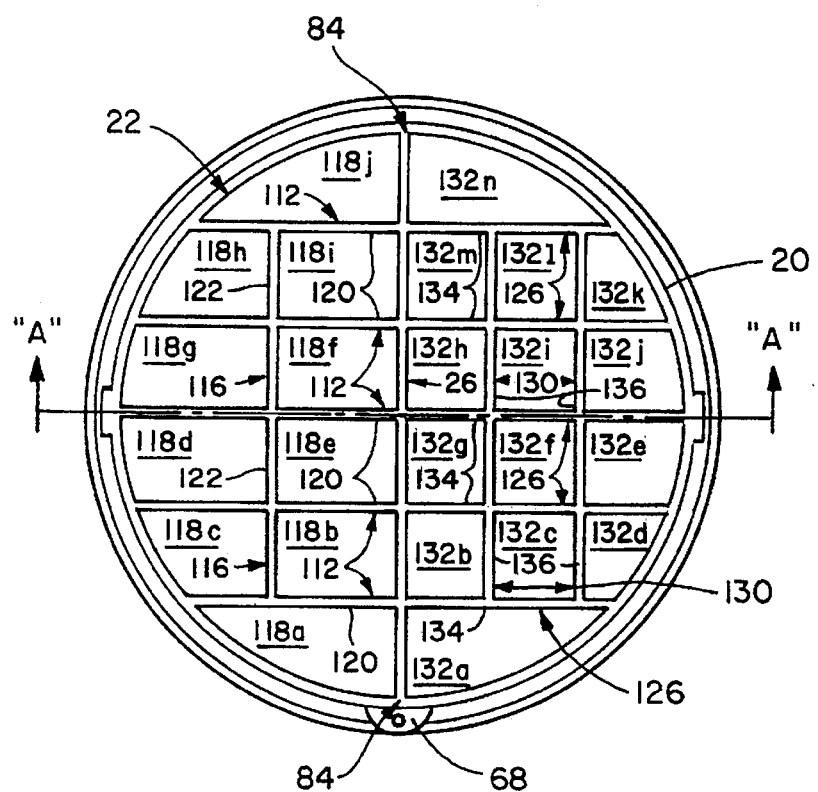
FIG. 3 is a top internal view of my bucket sized fisherman's tackle box in FIG. 1 with the pair of semi-circular top lid members removed and the bucket sized fisherman's tackle box being seated on the circular planar closed bottom portion of the standard five gallon bucket.

The bucket 12 is defined by a circular open top portion 14 and a circular planar closed bottom portion 16. Into the bucket 12 my bucket sized fisherman's tackle box 10 is adapted for complete containment inside the bucket in seated engagement on bottom portion 16 of the bucket. Stated another way, as seen in FIG. 3, the tackle box 10 is sized for spaced relation between an outermost circumference of the tackle box, including latch closure means and an external tab member as hereinafter described in detail, and an inner surface 64 of the standard bucket when the tackle box is completely contained inside the standard bucket. Then, ice fisherman's gear including bait, food, poles, gaff, tip-ups, etc. can be placed in the bucket with the tackle box 10 and simultaneous all these articles can be transported as one unit.

The bucket sized fisherman's tackle box 10 comprises a cylindrical housing wall 20 having a generally horizontal open top rim 22 and an oppositely facing generally horizontal open bottom rim 24. As seen in FIGS. 3–6, internally of the tackle box 10 is located a vertical partition 26 having a height coextensive with a length of the cylindrical housing wall.

The vertical partition 26 is further defined by a top edge 28, a bottom edge 30, a first edge 32 and a second edge 34. The first edge 32 is connected to the cylindrical housing wall 20 at a first vertical internal cylindrical wall position 36. The vertical partition then extends vertically across an internal distance of the cylindrical housing wall and the second edge 34 is connected to the cylindrical housing wall at a second vertical internal cylindrical wall position 40.

Referring back to FIG. 1, a pair of semi-circular top lid members 42 are independently pivotally hinged adjacent each other to the top edge 28 of the vertical partition. Excellent results are obtained when a top hinge rod 43 simultaneously connects axially interlocking left top lid elements 45a with axially interlocking right top lid elements 45b with axially interlocking top edge elements 45c. Further, axially interlocking left top lid elements 45a and axially interlocking right top lid elements 45b should have a top hinge rod receiving hole 44 sized to be slightly larger than a diameter of the hinge rod 43 to insure free pivoting movement of each member of the respective pair of semi-circular top lid members 42. Conversely, axially interlocking top edge elements 45c should have a top hinge rod receiving hole 44 sized slightly smaller than the diameter of the hinge rod 43 thereby maintaining the top hinge rod in connected relationship with the members 45a, 45b and 45c once the rod 43 is inserted therein.

The pair of semi-circular top lid members 42 are sized to independently sealingly engage the open top rim 22 of the cylindrical housing wall when each member of the pair of semi-circular top lid members is in a top closed position as seen in FIG. 1. To this end, the pair of semi-circular top lid members 42 are sized to have an outer edge 50 at least coextensive with an outer circumference of the cylindrical housing wall thereby at least completely overlying the open top rim 22. In operation, each member of the pair of semi-circular top lid members 42 can pivot through an arc range between zero degrees and about 180 degrees. Each member of the pair of semi-circular top lid members 42 can be simultaneously pivoted to an open position, not specifically shown in the drawings, as desired, with the only restriction being that the complementary arc range of motion cannot exceed 180 degrees.

A handle 66 is independently pivotally hinged to the top edge 28 of the vertical partition. The handle 66 is axially interlocking with the axially interlocking left top lid elements 45a, the axially interlocking right top lid elements 45b and the axially interlocking top edge elements 45c. In assembly, where the handle is axially interlocking with the elements 45a, 45b and 45c, the handle, namely its interlocking handle elements 66a, are preferred to have a top hinge receiving hole sized to be slightly larger than the diameter of the top hinge rod 43 to insure flee pivoting movement of the handle. In operation, the handle can pivot freely through an arc range between zero degrees and about 180 degrees, depending on the relative positioning of the top lid members 42.

The tackle box 10 further includes an external tab member 68 rigidly connected to the cylindrical housing wall. The external tab member is adapted for attaching a strap 70 thereto enabling transportation of the tackle box independently of the standard bucket.

Another feature of my bucket sized fisherman's tackle box 10 is a pair of spaced apart leveling feet 72 secured to each outer surface of a respective pair of semi-circular top and bottom lid members 42 and 46 (described in detail hereinafter). The pair of spaced apart leveling feet 72 enable a parallel positioning of the tackle box 10 relative to another parallel flat surface, e.g., the circular planar closed bottom portion 16 of the tackle box, a ground surface, etc.

Figure 2:
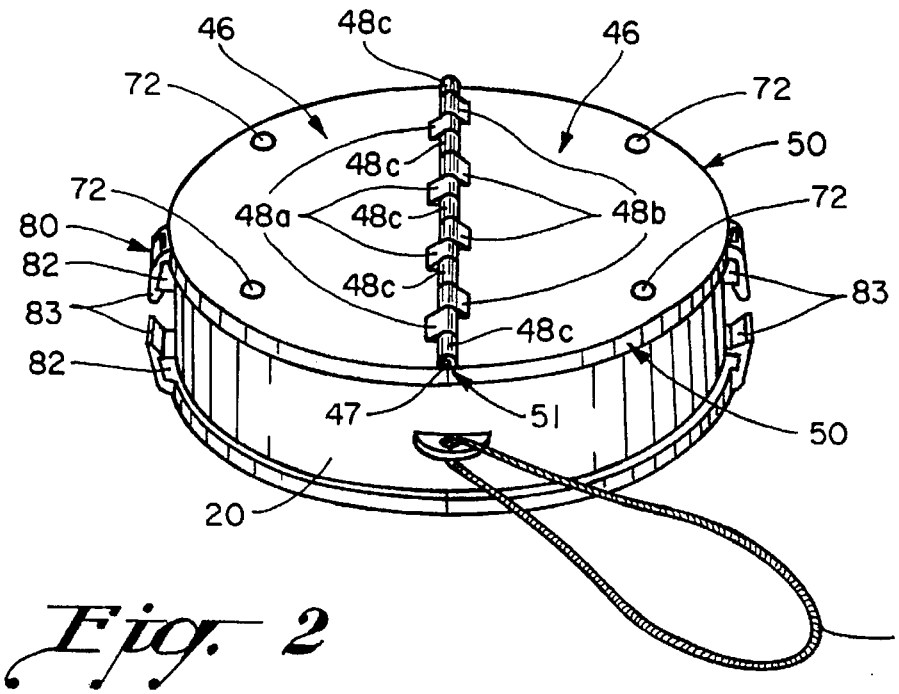
FIG. 2 is a bottom perspective view of my bucket sized fisherman's tackle box in FIG. 1.

Turning now to FIG. 2, one will see a pair of semi-circular bottom lid members 46 independently pivotally hinged adjacent each other to the bottom edge 30 of the vertical partition. Excellent results are obtained when a bottom hinge rod 47 simultaneously connects axially interlocking left bottom lid elements 48a with axially interlocking right bottom lid elements 48b with axially interlocking bottom edge elements 48c. Further, axially interlocking left bottom lid elements 48a and axially interlocking right bottom lid elements 48b should have a bottom hinge rod receiving hole 51 sized to be slightly larger than a diameter of the bottom hinge rod 47 to insure free pivoting movement of each member of the respective pair of semi-circular bottom lid members 46. Conversely, axially interlocking bottom edge elements 48c should have a bottom hinge rod receiving hole 51 sized slightly smaller than the diameter of the bottom hinge rod 47 thereby maintaining the bottom hinge rod in connected relationship with the members 48a, 48b and 48c once the rod 47 is inserted therein.

The pair of semi-circular bottom lid members 46 are sized to independently sealingly engage the open bottom rim 24 of the cylindrical housing wall when each member of the pair of semi-circular bottom lid members is in a bottom closed position as seen in FIG. 2. To this end, the pair of semi-circular bottom lid members 46 are sized to have an outer edge 50 at least coextensive with an outer circumference of the cylindrical housing wall thereby at least completely overlying the open bottom rim 24. In operation, each member of the pair of semi-circular bottom lid members 46 can pivot through an arc range between zero degrees and about 180 degrees. Each member of the pair of semi-circular bottom lid members 46 can be simultaneously pivoted to an open position, not specifically shown in the drawings, as desired, with the only restriction being that the complementary arc range of motion cannot exceed 180 degrees.

Each member 42 and 46 of the respective pair of semi-circular top and bottom lid members have latch closure means comprising a resilient lip-latch 80 snap-fitted over a pin 82. The resilient lip-latch is connected to each lid member 42 and 46 and the pin is connected to the cylindrical housing wall adjacent the resilient lip-latch. The latch closure means maintains each lid member 42 and 46 in its respective top and bottom closed position, as desired, when the lip 83 of the lip-latch 80 is snap-fitted over the pin 82, the lip-latch having a resilient memory characteristic.

In the preferred embodiment of my invention, it is contemplated that the lip-latch 80 will have a center cut out portion 81, as shown in FIG. 6. In this way, in operation the lip-latch with the center cut out portion 81 enables a user to easily press one's thumb against the pin 82 while simultaneously prying with one's fingers adjacent the lip 83 of the lip-latch to pry the resilient lip out of engagement with the pin and thereby enable opening of the desired lid member 42 and 46. It should be understood, however, that the center cut out portion is not necessary to achieve the features and advantages of my latch closure means and that other equivalent structures may be possible which still embody the scope of my invention. Without the center cut out portion 81 a sufficient lip 83 could still be maintained to enable the lip-latch to be snap-fitted over the lip with the center cut out portion extending through the lip-latch as shown in FIG. 6. Further, excellent results are obtained when the lip-latch 80 and the pin 82 are curved coextensive with the outer edge 50.

Now referring to FIGS. 3–5, in the preferred embodiment of my invention excellent results are obtained when the vertical partition 26 extends along a diameter 84 of the cylindrical housing wall. The diameter 84 thereby divides the internal volume of the cylindrical housing wall equally in half with a first half of the volume being on a left side 86 of the vertical partition and a second half of the volume being on a right side 88 of the vertical partition.

Further, in the preferred embodiment of my invention, excellent results are obtained when an at least one horizontal partition comprises a left semi-circular horizontal partition 90 and a right semi-circular horizontal partition 92. It should be understood, however, that only one horizontal partition would be necessary to achieve the feature and advantages of my disclosed and claimed invention.

In my preferred embodiment, each left and right semi-circular horizontal partition extends away from the other. The left semi-circular horizontal partition has a left first end 54 and a left second end 56. The left first end 54 connects with the cylindrical housing wall at a left first horizontal internal cylindrical wall location 58. The left horizontal partition 90 extends horizontally between the cylindrical housing wall and the vertical partition 26. The left second end 56 connects with the vertical partition at a left first vertical partition location 60 parallel to the left first horizontal internal cylindrical wall location 58. Similarly, the right semi-circular horizontal partition has a right first end 54a and a right second end 56a. The right first end 54a connects with the cylindrical housing wall at a right first horizontal internal cylindrical wall location 58a. The right horizontal partition 92 extends horizontally between the cylindrical housing wall and the vertical partition 26. The right second end 56a connects with the vertical partition at a right first vertical partition location 60a parallel to the right first horizontal internal cylindrical wall location 58a.

The left semi-circular horizontal partition divides the first half of the volume on the left side of the vertical partition into a left upper compartment 94 completely separate and sealed off from an underlying left lower compartment 96. The right semi-circular horizontal partition divides the second half of the volume on the right side of the vertical partition into a right upper compartment 98 completely separate and sealed off from an underlying right lower compartment 100.

The unique features of my invention that differ significantly from any of those in the prior art specifically concern the mathematically configured and proportioned internal compartments and sub-compartments of my tackle box 10. Stated differently, the compartments and sub-compartments have been configured to best accommodate an ice fisherman's artificial bait and tackle gear in a single tackle box unit easily accessible from either the top or the bottom. Further, the mathematically configured and proportioned compartment and sub-compartments are arranged such that if the tackle box were to be folded in half along a line A—A, the compartments or sub-compartments on one side of the line A—A would be a mirror image of the compartments or sub-compartments an opposite side of the line A—A. In this regard, the following paragraphs describe the mathematically configured and proportioned internal compartments and sub-compartments of the preferred embodiment of my tackle box 10.

Turning to FIG. 4, the underlying left lower compartment 96 comprises six equal width left lower separate parallel sectors in side by side relation along a diameter length of the diameter of the cylindrical housing wall. Each sector extends perpendicularly away from the diameter of the cylindrical housing wall. Each sector is separated from another sector by a series of left lower vertical sector walls 104 extending perpendicularly from the diameter of the cylindrical housing wall to the cylindrical housing wall. In this way the sector walls define six left lower sub-compartments 105a–f in the left lower compartment 96.

In order to seal the left lower sub-compartments from each other, a lower edge 106 of the series of left lower vertical sector walls sealingly engages the respective member of the pair of semi-circular bottom lid members 46 when the respective member of the pair of semi-circular bottom lid members is in the bottom closed position.

The underlying right lower compartment comprises a semi-circular open storage space 108 for larger artificial bait, lures, etc.

Next, referring to FIG. 3, the left upper compartment 94 comprises six equal width left upper separate parallel sectors in side by side relation along the diameter length of the diameter of the cylindrical housing wall. Each sector extends perpendicularly away from the diameter of the cylindrical housing wall and is separated from another sector by a series of left upper vertical sector walls 112. Each member of the series extends perpendicularly from the diameter of the cylindrical housing wall to the cylindrical housing wall.

The left upper compartment is further defined by a left middle four of the six equal width left upper separate parallel sectors including a left upper vertical sub-sector wall 116 traversing the left middle four of the sectors and being parallel to the diameter 84 of the cylindrical housing wall. In this way the sector walls 112 and sub-sector walls 116 define ten left upper sub-compartments 118a–j in the left upper compartment 94.

In order to seal the left upper sub-compartments from each other, a first left upper edge 120 of the series of left upper vertical sector walls 112 and a second left upper edge 122 of the left upper vertical sub-sector wall 116, each sealingly engage the respective member of the pair of semi-circular top lid members 42 when the respective lid member is in the top closed position.

Finally, the right upper compartment 98 comprises six equal width right upper separate parallel sectors in side by side relation along the diameter length 84 of the diameter of the cylindrical housing wall. Each sector extends perpendicularly away from the diameter of the cylindrical housing wall and each sector is separated from another sector by a series of right upper vertical sector walls 126. Each member of the series 126 extends perpendicularly from the diameter of the cylindrical housing wall to the cylindrical housing wall.

The right upper compartment is further defined by a right middle four of the six equal width right upper separate parallel sectors further including a pair of right upper vertical sub-sector walls 130 each traversing the right middle four of the six equal width right upper separate parallel sectors. Each of the pair of right upper vertical sub-sector walls 130 is parallel to the diameter of the cylindrical housing wall. In this way the sector walls 126 and the sub-sector walls 130 define fourteen right upper sub-compartments 132a–n in the right upper compartment 98.

In order to seal the right upper sub-compartments from each other, a first right upper edge 134 of the pair of right upper vertical sector walls 126 and a pair of second right upper edges 136 of the pair of right upper vertical sub-sector walls 130, each sealingly engage the respective member of the pair of semi-circular top lid members 42 when the respective lid member is in the top closed position.

Furthering the features of my invention to maximize the total internal storage space available in the fisherman's tackle box 10, the following volume characteristics achieve excellent results in the overall arrangement of sub-compartments therein. In particular the total volume of sub-compartments 118c, 119d, 118g and 118h equal the total volume of sub-compartments 118b, 118e, 118f, and 118i. Also, the total volume of sub-compartments 132b, 132g, 132h, and 132m equal the total volume of sub-compartments 132c, 132f, 132i, and 132l which equal the total volume of sub-compartments 132d, 132e, 132j, and 132k.

In constructing my invention certain advantages are obtained by using particular materials and particular constructions. In particular cost efficiency and durability are excellently maintained when the cylindrical housing wall 20, the vertical partition 26 and the horizontal partitions 90 and 92 are integrally connected with each being constructed of an opaque synthetic plastic molded material. A further advantage is obtained to aid the internal viewing from the outside when each member of the respective pair of semi-circular top and bottom lid members 42 and 46 being constructed of a semi-transparent synthetic plastic material.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. A bucket sized fisherman's tackle box adapted for complete containment inside a standard bucket enabling simultaneous transportation of the bucket sized fisherman's tackle box, bait, food, poles, gaff and tip-ups all together inside the standard bucket, the bucket sized fisherman's tackle box comprising:

a cylindrical housing wall with a generally horizontal open top rim and an oppositely facing generally horizontal open bottom rim;

a vertical partition having a height coextensive with a length of the cylindrical housing wall;

the vertical partition having a top edge, a bottom edge, a first edge and a second edge;

the first edge of the vertical partition connecting with the cylindrical housing wall at a first vertical internal cylindrical wall position, the vertical partition extending vertically across an internal distance of the cylindrical housing wall and the second edge of the vertical partition connecting with the cylindrical housing wall at a second vertical internal cylindrical wall position;

a pair of semi-circular top lid members independently pivotally hinged adjacent each other to the top edge of the vertical partition;

the pair of semi-circular top lid members independently sealingly engaging the generally horizontal open top rim of the cylindrical housing wall when each member of the pair of semi-circular top lid members are in a top closed position;

a pair of semi-circular bottom lid members independently pivotally hinged adjacent each other to the bottom edge of the vertical partition;

the pair of semi-circular bottom lid members independently sealingly engaging the generally horizontal open bottom rim of the cylindrical housing wall when each member of the pair of semi-circular bottom lid members are in a bottom closed position;

each member of the respective pair of semi-circular top and bottom lid members having latch closure means for maintaining each member of the respective pair of semi-circular top and bottom lid members in respective top and bottom closed positions, the latch closure means being located at an outer edge of each member of the respective pair of semi-circular top and bottom lid members;

at least one horizontal partition, each of the at least one horizontal partitions having a first end and a second end, the first end of the at least one horizontal partition connecting with the cylindrical housing wall at a first horizontal internal cylindrical wall location, the at least one horizontal partition extending horizontally between the cylindrical housing wall and the vertical partition, the second end of the at least one horizontal partition connecting with the vertical partition at a first vertical partition location parallel to the first internal cylindrical wall location;

the bucket sized fisherman's tackle box being sized for spaced relation between an outermost circumference of the bucket sized fisherman's tackle box and an inner surface of the standard bucket when the bucket sized fisherman's tackle box is completely contained inside the standard bucket.

2. The bucket sized fisherman's tackle box of claim 1, wherein a handle is independently pivotally hinged to the top edge of the vertical partition independently pivotally interlocking with the pair of semi-circular top lid members at the top edge of the vertical partition.

3. The bucket sized fisherman's tackle box of claim 1, wherein an external tab member is rigidly connected to the cylindrical housing wall, the external tab member being adapted for attaching a strap thereto enabling transportation of the bucket sized fisherman's tackle box independently of the standard bucket.

4. The bucket sized fisherman's tackle box of claim 1, wherein a pair of spaced apart leveling feet are secured to each member of the respective pair of semi-circular top and bottom lid members, the pair of spaced apart leveling feet enabling a parallel positioning of the bucket sized fisherman's tackle box relative to another parallel flat surface.

5. The bucket sized fisherman's tackle box of claim 1, wherein the cylindrical housing wall, the vertical partition and the at least one horizontal partition are integrally connected comprising a synthetic plastic molded material.

6. The bucket sized fisherman's tackle box of claim 1, wherein the cylindrical housing wall, the vertical partition and the at least one horizontal partition comprise an opaque material.

7. The bucket sized fisherman's tackle box of claim 1, wherein each respective pair of semi-circular top and bottom lid members comprise a semi-transparent material.

8. The bucket sized fisherman's tackle box of claim 1, wherein the latch closure means comprises a resilient lip-latch snap-fitted over a pin, the resilient lip-latch being connected to each member of the respective pair of semi-circular top and bottom lid members and the pin being connected to the cylindrical housing wall adjacent the resilient lip-latch.

9. The bucket sized fisherman's tackle box of claim 1, wherein the vertical partition extends along a diameter of the cylindrical housing wall and thereby divides the volume internally of the cylindrical housing wall equally in half with a first half of the volume being on a left side of the vertical partition and a second half of the volume being on a right side of the vertical partition.

10. The bucket sized fisherman's tackle box of claim 9, wherein the at least one horizontal partition comprises a left semi-circular horizontal partition and a right semi-circular horizontal partition, each respective left and right semi-circular horizontal partition extending away from each other, the left semi-circular horizontal partition dividing the first half of the volume on the left side of the vertical partition into a left upper compartment completely separate and sealed off from an underlying left lower compartment, the right semi-circular horizontal partition dividing the second half of the volume on the right side of the vertical partition into a right upper compartment completely separate and sealed off from an underlying right lower compartment.

11. The bucket sized fisherman's tackle box of claim 10, wherein the underlying left lower compartment comprises six equal width left lower separate parallel sectors in side by side relation along a diameter length of the diameter of the cylindrical housing wall extending perpendicularly away from the diameter of the cylindrical housing wall, each of the six equal width left lower parallel sectors being separated from another of the six equal width left lower parallel sectors by a series of left lower vertical sector walls extending perpendicularly from the diameter of the cylindrical housing wall to the cylindrical housing wall and thereby defining six left lower sub-compartments in the left lower compartment.

12. The bucket sized fisherman's tackle box of claim 11, wherein a lower edge of the series of left lower vertical sector walls sealingly engages the respective member of the pair of semi-circular bottom lid members when the respective member of the pair of semi-circular bottom lid members is in the bottom closed position.

13. The bucket sized fisherman's tackle box of claim 10, wherein the underlying right lower compartment comprises a semi-circular open storage space.

14. The bucket sized fisherman's tackle box of claim 10, wherein the left upper compartment comprises six equal width left upper separate parallel sectors in side by side relation along a diameter length of the diameter of the cylindrical housing wall extending perpendicularly away from the diameter of the cylindrical housing wall, each of the six equal width left upper parallel sectors being separated from another of the six equal width left upper parallel sectors by a series of left upper vertical sector walls extending perpendicularly from the diameter of the cylindrical housing wall to the cylindrical housing wall.

15. The bucket sized fisherman's tackle box of claim 14, wherein a left middle four of the six equal width left upper separate parallel sectors further include a left upper vertical sub-sector wall traversing the left middle four of the six equal width left upper separate parallel sectors and being parallel to the diameter of the cylindrical housing wall and thereby defining ten left upper sub-compartments in the left upper compartment.

16. The bucket sized fisherman's tackle box of claim 15, wherein a first left upper edge of the series of left upper vertical sector walls and a second left upper edge of the left upper vertical sub-sector wall each sealingly engage the respective member of the pair of semi-circular top lid members when the respective member of the pair of semi-circular top lid members is in the top closed position.

17. The bucket sized fisherman's tackle box of claim 10, wherein the right upper compartment comprises six equal width right upper separate parallel sectors in side by side relation along a diameter length of the diameter of the cylindrical housing wall extending perpendicularly away from the diameter of the cylindrical housing wall, each of the six equal width right upper parallel sectors being separated from another of the six equal width right upper parallel sectors by a series of right upper vertical sector walls extending perpendicularly from the diameter of the cylindrical housing wall to the cylindrical housing wall.

18. The bucket sized fisherman's tackle box of claim 17, wherein a right middle four of the six equal width right upper separate parallel sectors further include a pair of right upper vertical sub-sector walls traversing the right middle four of the six equal width right upper separate parallel sectors, each of the pair of right upper vertical sub-sector walls being parallel to the diameter of the cylindrical housing wall and thereby defining fourteen right upper sub-compartments in the right upper compartment.

19. The bucket sized fisherman's tackle box of claim 18, wherein a first right upper edge of the series of right upper vertical sector walls and a pair of second right upper edges of the pair of right upper vertical sub-sector walls each sealingly engage the respective member of the pair of semi-circular top lid members when the respective member of the pair of semi-circular top lid members is in the top closed position.

20. In combination, a standard five gallon bucket;
the standard five gallon bucket defined by a circular open top portion and circular planar closed bottom portion;
a bucket sized fisherman's tackle box adapted for complete containment inside the standard five gallon bucket and for seated engagement on the circular planar closed bottom portion of the standard five gallon bucket;
the bucket sized fisherman's tackle box comprising: a cylindrical housing wall with a generally horizontal open top rim and an oppositely facing generally horizontal open bottom rim;
a vertical partition having a height coextensive with a length of the cylindrical housing wall;
the vertical partition having a top edge, a bottom edge, a first edge and a second edge;
the first edge of the vertical partition connecting with the cylindrical housing wall at a first vertical internal cylindrical wall position, the vertical partition extending vertically across an internal distance of the cylindrical housing wall and the second edge of the vertical partition connecting with the cylindrical housing wall at a second vertical internal cylindrical wall position;
a pair of semi-circular top lid members independently pivotally hinged adjacent each other to the top edge of the vertical partition;
the pair of semi-circular top lid members independently sealingly engaging the generally horizontal open top rim of the cylindrical housing wall when each member of the pair of semi-circular top lid members are in a top closed position;
a pair of semi-circular bottom lid members independently pivotally hinged adjacent each other to the bottom edge of the vertical partition;
the pair of semi-circular bottom lid members independently sealingly engaging the generally horizontal open bottom rim of the cylindrical housing wall when each member of the pair of semi-circular bottom lid members are in a bottom closed position;
each member of the respective pair of semi-circular top and bottom lid members having latch closure means for maintaining each member of the respective pair of semi-circular top and bottom lid members in respective top and bottom closed positions, the latch closure means being located at an outer edge of each member of the respective pair of semi-circular top and bottom lid members;
at least one horizontal partition, the horizontal partition having a first end and a second end, the first end of the horizontal partition connecting with the cylindrical housing wall at a first horizontal internal cylindrical wall location, the horizontal partition extending horizontally between the cylindrical housing wall and the vertical partition, the second end of the horizontal partition connecting with the vertical partition at a first vertical partition location parallel to the first internal cylindrical wall location;
the bucket sized fisherman's tackle box being sized for spaced relation between an outermost circumference of the bucket sized fisherman's tackle box and an inner surface of the standard five gallon bucket when the bucket sized fisherman's tackle box is completely contained inside the standard bucket and in seated engagement on the circular planar closed bottom portion of the standard five gallon bucket.

21. The combination of claim 20, wherein the vertical partition extends along a diameter of the cylindrical housing wall and thereby divides the volume internally of the cylindrical housing wall equally in half with a first half of the volume being on a left side of the vertical partition and a second half of the volume being on a right side of the vertical partition.

22. The combination of claim 21, wherein the at least one horizontal partition comprises a left semi-circular horizontal partition and a right semi-circular horizontal partition, each respective left and right semi-circular horizontal partition extending away from each other, the left semi-circular horizontal partition dividing the first half of the volume on the left side of the vertical partition into a left upper compartment completely separate and sealed off from an underlying left lower compartment, the right semi-circular horizontal partition dividing the second half of the volume on the right side of the vertical partition into a right upper compartment completely separate and sealed off from an underlying right lower compartment.

23. The combination of claim 22, wherein the underlying left lower compartment comprises six equal width left lower separate parallel sectors in side by side relation along a diameter length of the diameter of the cylindrical housing wall extending perpendicularly away from the diameter of the cylindrical housing wall, each of the six equal width left lower parallel sectors being separated from another of the six equal width left lower parallel sectors by a series of left lower vertical sector walls extending perpendicularly from the diameter of the cylindrical housing wall to the cylindrical housing wall.

24. The combination of claim 23, wherein a lower edge of the series of left lower vertical sector walls sealingly engages the respective member of the pair of semi-circular bottom lid members when the respective member of the pair of semi-circular bottom lid members is in the bottom closed position.

25. The combination of claim 24, wherein the underlying right lower compartment comprises a semi-circular open storage space.

26. The combination of claim 25, wherein the left upper compartment comprises six equal width left upper separate parallel sectors in side by side relation along the diameter length of the diameter of the cylindrical housing wall extending perpendicularly away from the diameter of the cylindrical housing wall, each of the six equal width left upper parallel sectors being separated from another of the six equal width left upper parallel sectors by a series of left upper vertical sector walls extending perpendicularly from the diameter of the cylindrical housing wall to the cylindrical housing wall.

27. The combination of claim 26, wherein a left middle four of the six equal width left upper separate parallel sectors further include a left upper vertical sub-sector wall traversing the left middle four of the six equal width left upper separate parallel sectors and being parallel to the diameter of the cylindrical housing wall and thereby defining ten left sub-compartments in the left upper compartment.

28. The combination of claim 27, wherein a first left upper edge of the series of left upper vertical sector walls and a second left upper edge of the left upper vertical sub-sector wall each sealingly engage the respective member of the pair of semi-circular top lid members when the respective member of the pair of semi-circular top lid members is in the top closed position.

29. The combination of claim 28, wherein the right upper compartment comprises six equal width right upper separate parallel sectors in side by side relation along the diameter length of the diameter of the cylindrical housing wall extending perpendicularly away from the diameter of the cylindrical housing wall, each of the six equal width right upper parallel sectors being separated from another of the six equal width right upper parallel sectors by a series of right upper vertical sector walls extending perpendicularly from the diameter of the cylindrical housing wall to the cylindrical housing wall.

30. The combination of claim 29, wherein a right middle four of the six equal width right upper separate parallel sectors further include a pair of right upper vertical sub-sector walls traversing the right middle four of the six equal width right upper separate parallel sectors, each of the pair of right upper vertical sub-sector walls being parallel to the diameter of the cylindrical housing wall and thereby defining fourteen right sub-compartments in the right upper compartment.

31. The combination of claim 30, wherein a first right upper edge of the series of right upper vertical sector walls and a pair of second right upper edges of the pair of right upper vertical sub-sector walls each sealingly engages the respective member of the pair of semi-circular top lid members when the respective member of the pair of semi-circular top lid members is in the top closed position.

32. The combination of claim 31, wherein the latch closure means comprises a resilient lip-latch snap-fitted over a pin, the resilient lip-latch being connected to each member of the respective pair of semi-circular top and bottom lid members and the pin being connected to the cylindrical housing wall adjacent the resilient lip-latch.

\* \* \* \* \*